United States Patent
Amini et al.

[11] Patent Number: 5,867,695
[45] Date of Patent: Feb. 2, 1999

[54] METHOD AND SYSTEM FOR REDUCED METASTABILITY BETWEEN DEVICES WHICH COMMUNICATE AND OPERATE AT DIFFERENT CLOCK FREQUENCIES

[75] Inventors: Ismael Z. Amini; Tze-Wing Keung; Andres M. Molina, all of Boca Raton, Fla.

[73] Assignee: International Business Machines Corp., Armonk, N.Y.

[21] Appl. No.: 962,425

[22] Filed: Oct. 16, 1992

[51] Int. Cl.⁶ .................................................. G06F 1/04
[52] U.S. Cl. ............................................................ 395/558
[58] Field of Search ............................ 370/108; 371/61; 375/118, 106; 395/250, 550, 575, 558; 307/527

[56] References Cited

U.S. PATENT DOCUMENTS

| | | | |
|---|---|---|---|
| 3,596,246 | 7/1971 | Nagakome et al. | 340/147 |
| 3,928,755 | 12/1975 | Bellanger et al. | 235/152 |
| 3,979,701 | 9/1976 | Tomozawa | 333/70 T |
| 4,176,400 | 11/1979 | Heckel | 395/250 |
| 4,282,489 | 8/1981 | De Rienzo | 328/206 |
| 4,405,898 | 9/1983 | Flemming | 328/72 |
| 4,562,402 | 12/1985 | Irvin | 328/63 |
| 4,571,674 | 2/1986 | Hartung | 395/250 |
| 4,575,644 | 3/1986 | Leslie | 328/63 |
| 4,742,454 | 5/1988 | Robinson et al. | 395/250 |
| 4,797,838 | 1/1989 | Nelson et al. | 364/551.01 |
| 4,835,422 | 5/1989 | Dike et al. | 307/518 |
| 4,841,550 | 6/1989 | George et al. | 375/118 |
| 4,868,514 | 9/1989 | Azevedo et al. | 328/155 |
| 5,020,038 | 5/1991 | Swapp et al. | 368/120 |
| 5,142,529 | 8/1992 | Parruck et al. | 370/84 |
| 5,144,170 | 9/1992 | Parker | 307/528 |
| 5,285,206 | 2/1994 | Peters et al. | 341/100 |
| 5,365,550 | 11/1994 | Roberson | 375/1 |

FOREIGN PATENT DOCUMENTS

| | | |
|---|---|---|
| O 217 486 A2 | 4/1987 | European Pat. Off. |
| O 273 100 A2 | 7/1988 | European Pat. Off. |
| WO 91/18331 | 11/1991 | WIPO |

OTHER PUBLICATIONS

"Asynchronous Digital Filter Interface Design," by R.E. Vogelsby, IBM Technical Disclosure Bulletin, vol. 31, No. 12, May, 1989, pp. 112 & 113.

*Primary Examiner*—Lance Leonard Barry
*Attorney, Agent, or Firm*—Andrew J. Dillon

[57] ABSTRACT

A method and system are provided for improved communication between devices. A first device having an associated first clock rate may communicate with a second device having an associated second clock rate. Particular periods of time are determined during which metastability may occur as a result of differences between the first clock rate and the second clock rate. Data transmitted from the first device to the second device is continually processed. During those particular periods of time when metastability may occur, the processed data is input into the second device. During all other periods of time, the data is input directly into the second device.

8 Claims, 4 Drawing Sheets

ND SYSTEM FOR REDUCED
METHOD AND SYSTEM FOR REDUCED METASTABILITY BETWEEN DEVICES WHICH COMMUNICATE AND OPERATE AT DIFFERENT CLOCK FREQUENCIES

BACKGROUND OF THE INVENTION

1. Technical Field

The present invention relates in general to methods and systems for improved communication between devices within a data processing system and in particular to methods and systems for processing data transmitted from a first device having a first clock rate to a second device having a second clock rate within a data processing system. Still more particularly, the present invention relates to methods and systems within a data processing system for inputting processed data into a device during particular periods of time during which metastability may occur and inputting data directly into a device during all other periods of time.

2. Description of the Related Art

In known data processing systems, data is typically transmitted via a data communication bus among computers and other devices within the data processing system. Each of these devices may operate at different clock rates. A sending device may operate at one clock rate while the receiving device may operate at a different clock rate. Data clocked by a sending device at the sending device's clock rate will appear to the receiving device to be asynchronous. Input latches are commonly used by the receiving device to receive this asynchronous data and synchronize the data to the receiving device's clock.

When devices operating at different clock rates are coupled together an unstable state, or metastable state, may occur. If data is received in a device by an input latch during the setup time of the input latch, the input latch may not select a state. This situation is commonly referred to as an unstable, or metastable state.

A common solution for avoiding metastability has been to double latch all data input into the receiving device. However, this solution introduces a delay for all input data whether or not the data may cause a metastable state.

It should therefore be apparent that a need exists for a method and system for processing input data received during those periods of time during which metastability may occur and for directly inputting data into a receiving device during all other periods of time.

SUMMARY OF THE INVENTION

It is therefore one object of the present invention to provide a method and system for improved communication between devices within a data processing system.

It is another object of the present invention to provide an improved method and system for processing data transmitted from a first device having a first clock rate to a second device having a second clock rate within a data processing system.

It is yet another object of the present invention to provide an improved method and system within a data processing system for inputting processed data into a device during particular periods of time during which metastability may occur and for inputting data directly into the device during all other periods of time.

The foregoing objects are achieved as is now described. A method and system are provided for improved communication between devices. A first device having an associated first clock rate may communicate with a second device having an associated second clock rate. Particular periods of time are determined during which metastability may occur as a result of differences between the first clock rate and the second clock rate. Data transmitted from the first device to the second device is continually processed. During those particular periods of time when metastability may occur, the processed data is input into the second device. During all other periods of time, the data is input directly into the second device.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
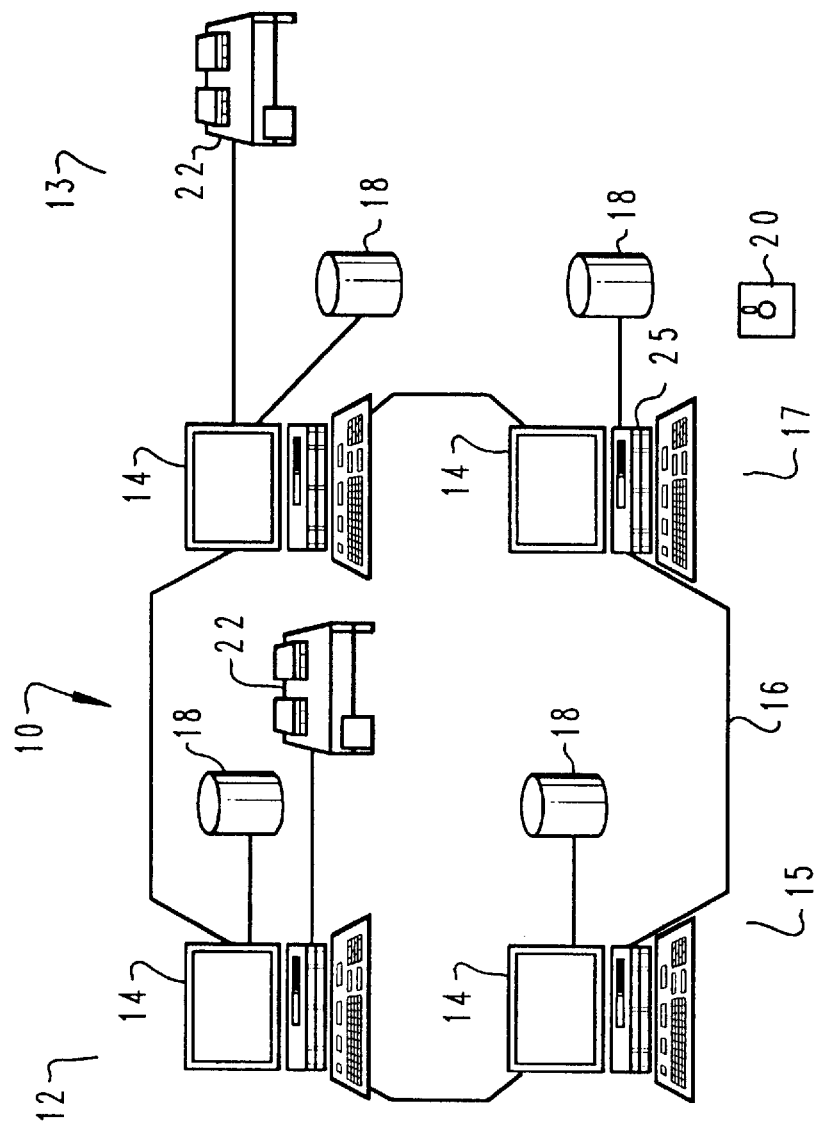
FIG. 1 depicts a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. As may be seen, data processing system 10 may include a plurality of workstations 12, 13, 15, and 17. Workstations 12, 13, 15, and 17 may include a computer 14, data storage devices 18 and 20, and a printer 22. Workstations 12, 13, 15, and 17 may be connected together in a local area network 16. One or more such storage devices 18 and 20 may be utilized, in accordance with the method and system of the present invention, to store the various data objects or documents which may be periodically accessed and processed by a user within data processing system 10.

Figure 2:
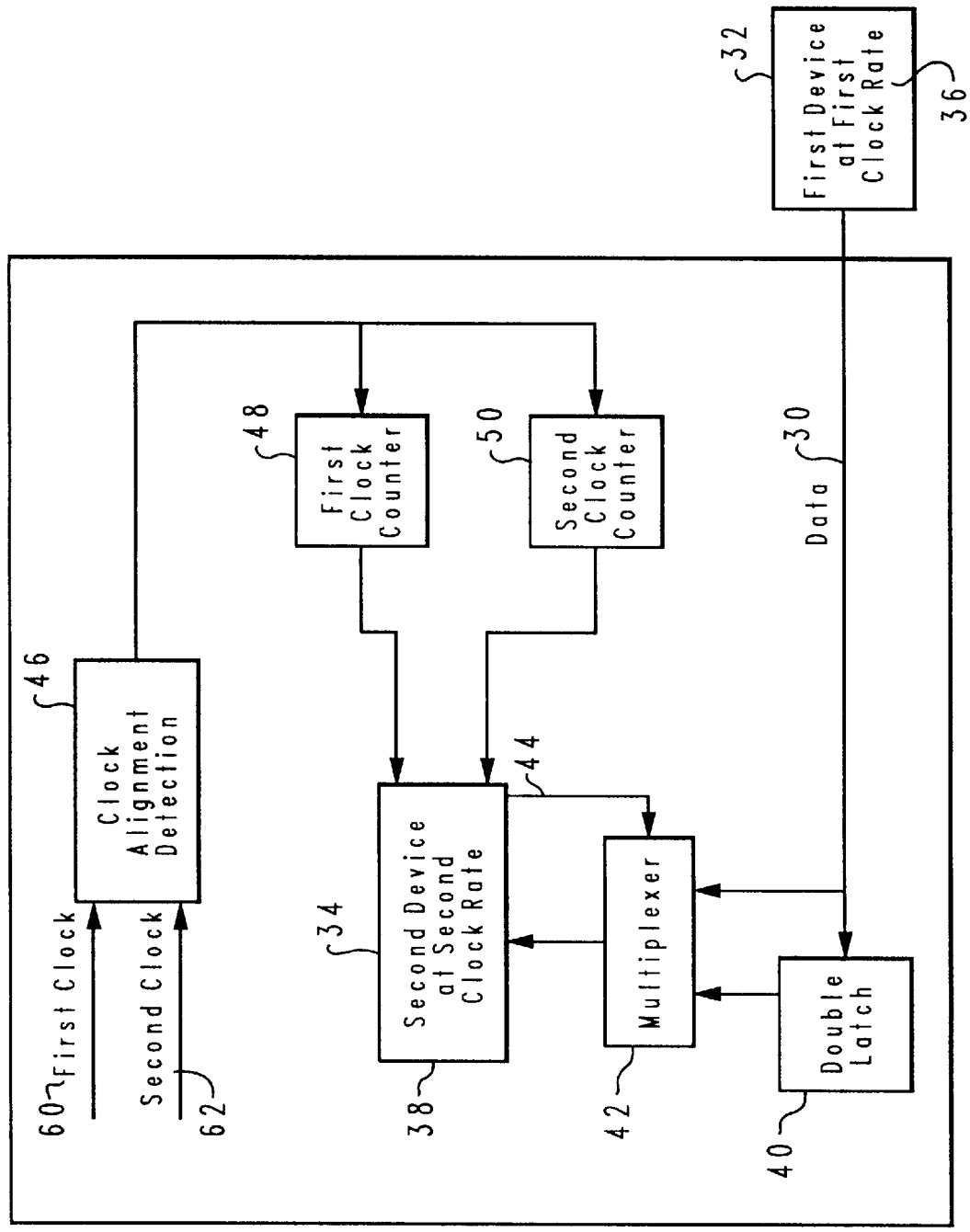
FIG. 2 illustrates a block diagram of a logic circuit designed to determine particular periods of time during which metastability may occur and to process data transmitted during the particular periods of time in accordance with the present invention.

Referring to FIG. 2, there is depicted a block diagram of a logic circuit designed to determine particular periods of time during which metastability may occur and to process data transmitted during the particular periods of time in accordance with the present invention. A first device 32 is coupled to a second device 34. First device 32 has an associated first clock rate 36 of 40 MHz and second device 34 has an associated second clock rate 38 of 50 MHz. Those skilled in the art will appreciate that first device 32 may be a data bus, data storage device, or any other device capable of communicating with computer devices.

Data 30 is clocked at first clock rate 36 and input into second device 34 either through a multiplexer 42 or first through a double latch 40 and then through multiplexer 42. Second device 34 selects, utilizing an input select signal 44, either an input from data processed through double latch 40, or data 30 directly without double latching.

In order to determine whether to select the data processed through double latch 40 or data 30, particular periods of time during which metastability may occur are determined. Metastability may occur as a result of differences between first clock rate 36 and second clock rate 38. Since data 30 is synchronized by a first clock 60 (see FIG. 3) operating at first clock rate 36, data 30 changes data levels synchronously with first clock 60. Metastability occurs as a result of a data level of data 30 changing during a set up time of input latches clocked by a second clock 62 (see FIG. 3). During the particular periods of time when metastability may occur, input select signal 44 selects data processed through double latch 40. During all other periods of time, input select 44 selects data 30 directly without double latching.

Two clocks having different frequencies which operate concurrently, such as first clock 60 and second clock 62, will align periodically. Clock alignment point detection logic 46 may be utilized to determine when first clock 60 and second clock 62 are aligned. Each alignment point may be used to reset a first clock counter 48 and a second clock counter 50. First clock counter 48 counts the number of clock pulses of first clock 60 and second clock counter 50 counts the number of clock pulses of second clock 62. Upon second device 34 receiving a predetermined number of clock pulses of one of the clocks, second device 34 may determine that a particular period of time has occurred and select data processed through double latch 40.

Figure 3:
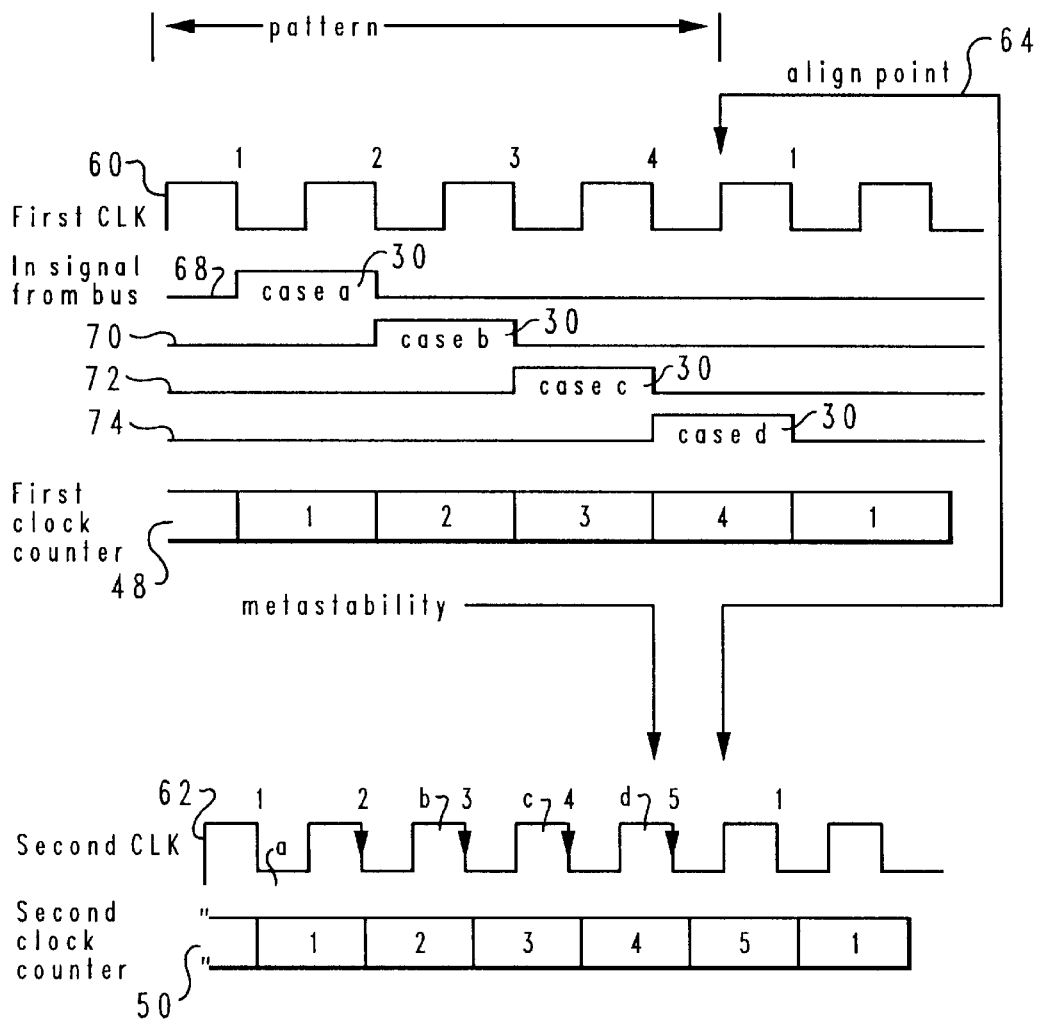
FIG. 3 depicts a timing diagram which illustrates examples of data transmitted from a first device to a second device in accordance with the present invention.

With reference now to FIG. 3, there is depicted a timing diagram which illustrates examples of data 30 transmitted from first device 32 to second device 34 in accordance with the present invention. First clock 60 and second clock 62 will periodically align as illustrated by align point 64. First clock counter 48 counts clock pulses of first clock 60 and resets in response to the occurrence of align point 64. As FIG. 3 illustrates, first clock 60 operating at 40 MHz counts from one to four and then resets to one in response to the occurrence of align point 64. Second clock counter 50 counts clock pulses of second clock 62 and resets in response to the occurrence of align point 64. Again as FIG. 3 illustrates, second clock 62 counts from one to five and then resets to one in response to the occurrence of align point 64.

In an example 68 of data 30 transmitted from first device 32 to second device 34, metastability will not occur. Data 30 changes data level synchronously with the falling edge of the first clock pulse of first clock 60. Data 30 in example 68 may be latched by an input latch in second device 34 in response to the falling edge of the second pulse of second clock 62. Data 30 has changed data levels before the setup time of an input latch clocked by second clock 60. Since there is no metastability problem in example 68, data 30 may be input into second device 34 without being processed through double latch 40.

In an example 70 of data 30 transmitted from first device 32 to second device 34, metastability will also not occur. Data 30 changes data level synchronously with the falling edge of the second clock pulse of first clock 60. Data 30 in example 70 may be latched by an input latch in second device 34 in response to the falling edge of the third pulse of second clock 62. Again, data 30 has changed data levels before the setup time of an input latch clocked by second clock 60. Since there is no metastability problem in example 68, data 30 may be input into second device 34 without being processed through double latch 40.

Example 72 also illustrates a case where metastability will not occur. In example 72, data 30 changes data level synchronously with the falling edge of the third clock pulse of first clock 60. Data 30 may be latched by an input latch in response to the falling edge of the fourth pulse of second clock 62. Data 30 has changed data levels before the setup time of an input latch clocked by second clock 60. Since there is no metastability problem in example 68, data 30 may be input into second device 34 without being processed through double latch 40.

Example 74 illustrates a particular period of time during which metastability may occur. Data 30 changes data level synchronously with the falling edge of the fourth clock pulse of first clock 60. Data 30 changes data levels just before the falling edge of the fifth clock pulse of second clock 62. Since data 30 may be latched by an input latch in response to the falling edge of the fifth clock pulse of second clock 62, data 30 may change data levels during the setup time of an input latch which may cause metastability. During the particular period of time of the fifth clock pulse of second clock 62, data 30 is processed through double latch 40.

Figure 4:
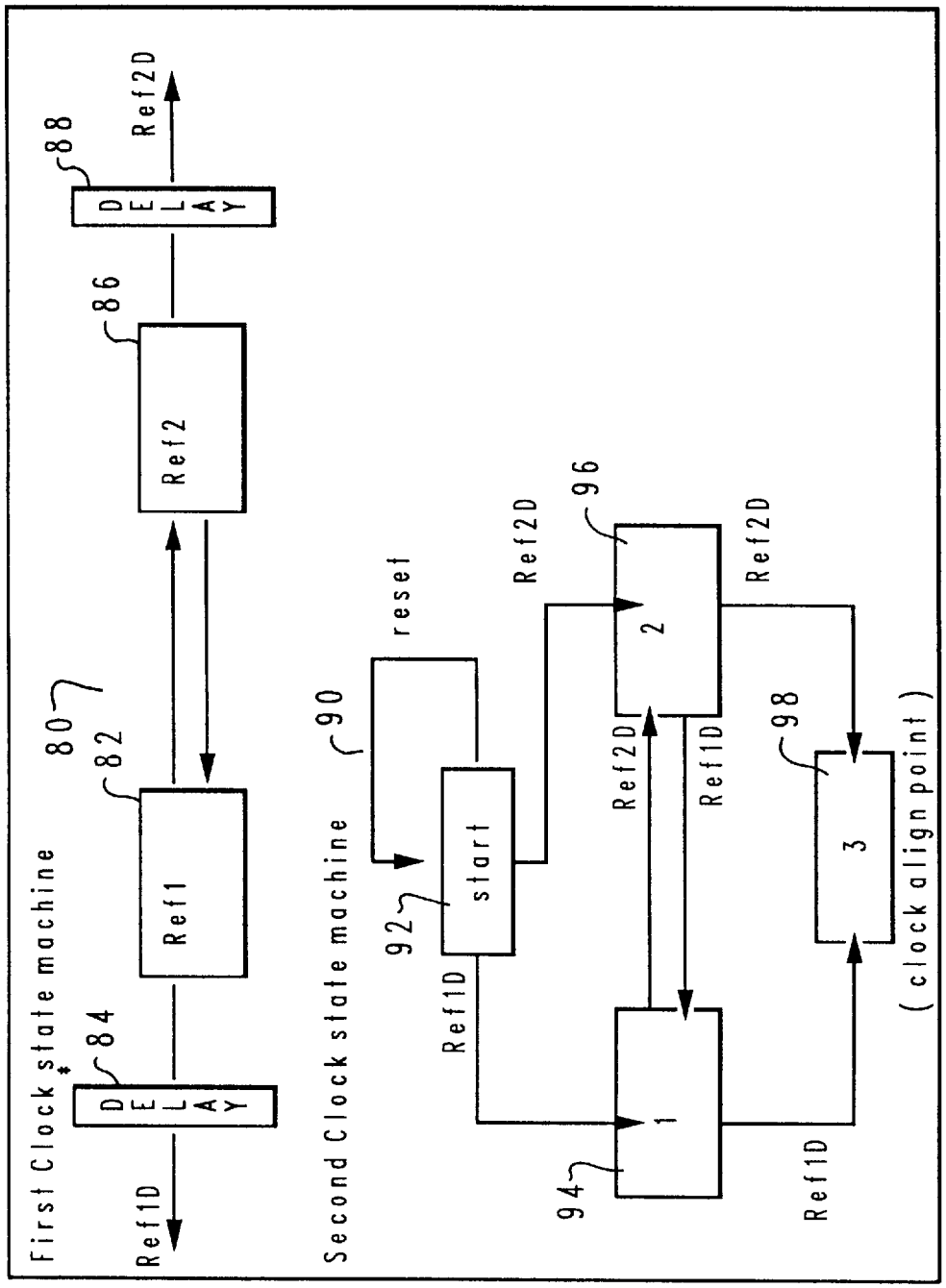
FIG. 4 depicts state machines illustrating the determination of an alignment of clocks operating at different clock rates in accordance with the present invention.

With reference to FIG. 4, there are depicted two state machines illustrating the determination of an alignment of clocks operating at different clock rates in accordance with the present invention. It should be apparent that other embodiments may be utilized to detect an alignment of clocks operating at different clock rates. In a preferred embodiment, state machine 80 changes state in response to each clock pulse of first clock 60. In response to a clock pulse of first clock 60, state box 82 illustrates a state of "Ref1". Block 84 depicts the addition of a time delay to "Ref1", thus generating an output state of "Ref1D" for the received clock pulse. In response to the next clock pulse of first clock 60, state machine changes to the next state illustrated by state box 86 which depicts an output of "Ref2". Block 88 depicts the addition of a time delay to "Ref2", thus generating an output state of "Ref2D". In response to the next clock pulse of first clock 60, state machine 80 changes to the next state illustrated by state box 82.

State machine 90 changes state in response to each clock pulse of second clock 62. State machine 90 starts as depicted at state block 92. In response to the detection of a reset condition, the next state is "Start" as illustrated by state block 92.

In response to the detection of a "Ref1D" state of state machine 80, the exit path from state box 92 is to state box 94 which illustrates a state of "1". The exit path from state box 94 depicting a state of "1" is to state box 96 depicting a state of "2" if state machine 90 detects a "Ref2D" state of state machine 80. The exit path from state box 94 depicting a state of "1" is to state box 98 depicting a state of "3" which designates an alignment of first clock 60 and second clock 62 if state machine 90 detects a "Ref1D" state of state machine 80.

In response to the detection of a "Ref2D" state of state machine 80, the exit path from state box 92 is to state box 96 which depicts a state of "2". The exit path from state box 96 depicting a state of "2" is to state box 94 which illustrates a state of "1" if state machine 90 detects a "Ref1D" state of state machine 80. The exit path from state box 96 depicting a state of "2" is to state box 98 depicting a state of "3" which designates an alignment of first clock 60 and second clock 62 if state machine 90 detects a "Ref2D" state of state machine 80.

Figure 5:
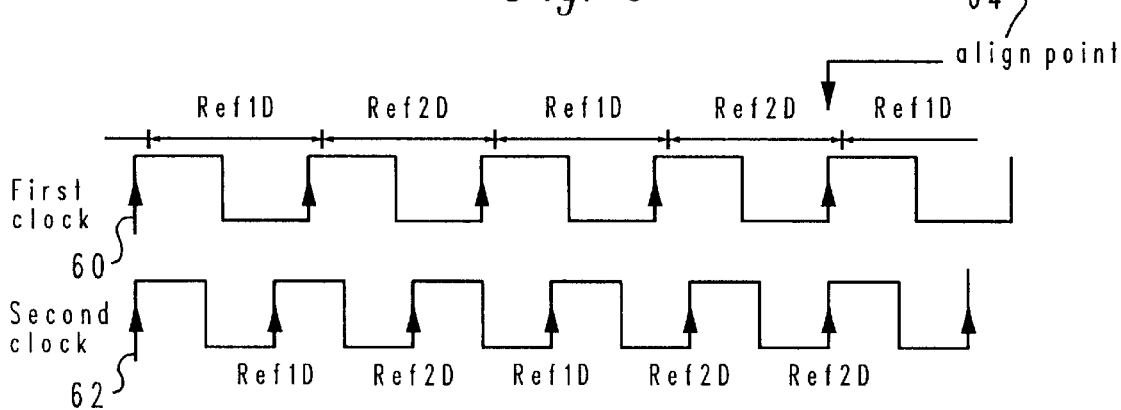
FIG. 5 depicts a timing diagram illustrating the determination of an alignment of clocks operating at different clock rates in accordance with the present invention.

Referring now to FIG. 5, there is illustrated a timing diagram depicting the determination of an alignment of clocks operating at different clock rates in accordance with the present invention. As FIG. 5 illustrates, the rising edge of clock pulse 2 of second clock 62 occurs followed by the rising edge of clock pulse 2 of first clock 60 then followed by the rising edge of clock pulse 3 of second clock 60. This timing sequence of the clock pulses continues until a clock alignment point occurs.

As disclosed above in the description of FIG. 4, the state machine 80 will change state with each clock pulse of first clock 60 alternating between states "Ref1D" and "Ref2D". Therefore as FIG. 5 depicts, state machine 80 will have a state of "Ref1D" for clock pulse 1 of first clock 60. State machine 80 will have a state of "Ref2D" for clock pulse 2 of first clock 60. The states of state machine 80 will alternate for each subsequent clock pulse.

State machine 90 will detect each change of state of state machine 80. At the rising edge of clock pulse 2 of second clock 62, state machine 90 will detect a state of "Ref1D" for state machine 80. At the rising edge of clock pulse 3 of second clock 62, state machine 90 will detect a state of "Ref2D" for state machine 80. At the rising edge of clock pulse 4 of second clock 62, state machine 90 will detect a state of "Ref1D" for state machine 80. State machine 90 will continue to detect a change of state for state machine 80 until the clock alignment point is reached. When state machine 90 detects no change in the state of state machine 80, the clock alignment point has been reached. For example, at the rising edge of clock pulse 5 of second clock 62, the state of state machine 80 is "Ref2D". At the rising edge of the next clock pulse of second clock 62 the state of state machine 80 is again "Ref2D". This is an indication that the clock detection point has been reached. At the clock alignment point, first clock counter 48 and second clock counter 50 are reset by clock alignment point detection logic 46.

It should be noted that a metastability problem could arise within state machine 80 and state machine 90 because first clock 60 and second clock 62 are not synchronized. This metastability problem should be carefully avoided.

In this manner each clock pulse of each clock may be identified. A particular period of time may be determined by identifying a particular clock pulse as a time during which metastability may occur. During operation, second device 34 may select double latch 40 utilizing input select 44 upon the occurrence of the particular clock pulse of one of the clocks.

While the invention has been particularly shown and described with reference to a preferred embodiment, it will be understood by those skilled in the art that various changes in form and detail may be made therein without departing from the spirit and scope of the invention.

We claim:

1. A method in a data processing system having a first clock operating at a first clock rate and a second clock operating at a second clock rate for improving communication between a first device associated with said first clock rate and a second device associated with said second clock rate, said method comprising within said data processing system the steps of:

determining particular periods of time during which metastability may occur as a result of data being transmitted from said first device at said first clock rate and received by said second device at said second clock rate;

continually processing said data by double latching said data transmitted from said first device to said second device;

during said particular periods of time, inputting said processed data into said second device; and during all other periods of time, inputting said data directly into said second device.

2. The method in a data processing system for improving communication between a first device having an associated first clock rate and a second device having an associated second clock rate according to claim 1 wherein said first clock has a plurality of first clock pulses and operates at said first clock rate and said second clock has a plurality of second clock pulses and operates at said second clock rate.

3. The method in a data processing system for improving communication between a first device having an associated first clock rate and a second device having an associated second clock rate according to claim 2 wherein said first clock has an associated first clock counter and said second clock has an associated second clock counter.

4. The method in a data processing system for improving communication between a first device having an associated first clock rate and a second device having an associated second clock rate according to claim 1 wherein said step of determining particular periods of time further comprises the steps of:

identifying a particular value of said first clock counter associated with a particular clock pulse;

determining an alignment of a particular one of said plurality of first clock pulses and a particular one of said plurality of second clock pulses;

resetting said first clock counter in response to a determination of said alignment;

receiving each of said plurality of first clock pulses and each of said plurality of second clock pulses;

incrementing a first value of said first clock counter in response to each receipt of each of said plurality of first clock pulses;

detecting said value of said first clock counter; and in response to detecting said particular value of said first clock counter, determining a particular period of time.

5. A data processing system having a first clock operating at a first clock rate and a second clock operating at a second clock rate for improving communication between a first device associated with said first clock rate and a second device associated with said second clock rate, said system comprising:

means for determining particular periods of time during which metastability may occur as a result of data being transmitted from said first device at said first clock rate and received by said second device at said second clock rate;

means for continually processing said data by double latching said data transmitted from said first device to said second device;

means for during said particular periods of time, inputting said processed data into said second device; and means for during all other periods of time, inputting said data directly into said second device.

6. The data processing system for improving communication between a first device having an associated first clock rate and a second device having an associated second clock rate according to claim 5 wherein said first clock has a plurality of first clock pulses and operates at said first clock rate and said second clock has a plurality of second clock pulses and operates at said second clock rate.

7. The data processing system for improving communication between a first device having an associated first clock rate and a second device having an associated second clock rate according to claim 6 wherein said first clock has an associated first clock counter and said second clock has an associated second clock counter.

8. The data processing system for improving communication between a first device having an associated first clock rate and a second device having an associated second clock rate according to claim 5 wherein said means for determining particular periods of time further comprises:

means for identifying a particular value of said first clock counter associated with a particular clock pulse;

means for determining an alignment of a particular one of said plurality of first clock pulses and a particular one of said plurality of second clock pulses;

means for resetting said first clock counter in response to a determination of said alignment;

means for receiving each of said plurality of first clock pulses and each of said plurality of second clock pulses;

means for incrementing a first value of said first clock counter in response to each receipt of each of said plurality of first clock pulses;

means for detecting said value of said first clock counter; and means for in response to detecting said particular value of said first clock counter, determining a particular period of time.

\* \* \* \* \*